April 2, 1935. J. B. MENTON 1,996,480
DOOR ARMREST
Filed May 7, 1932
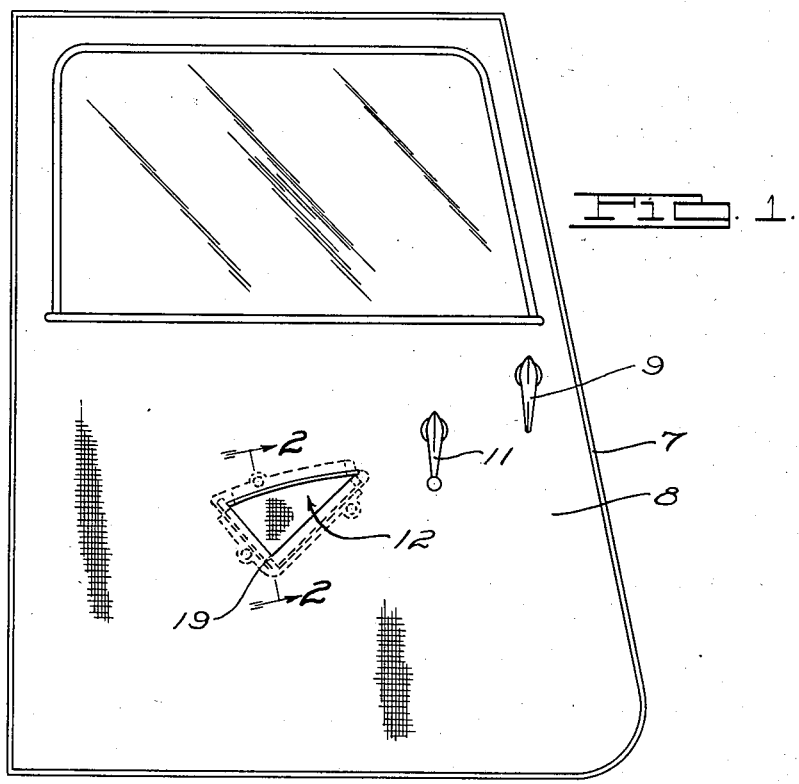
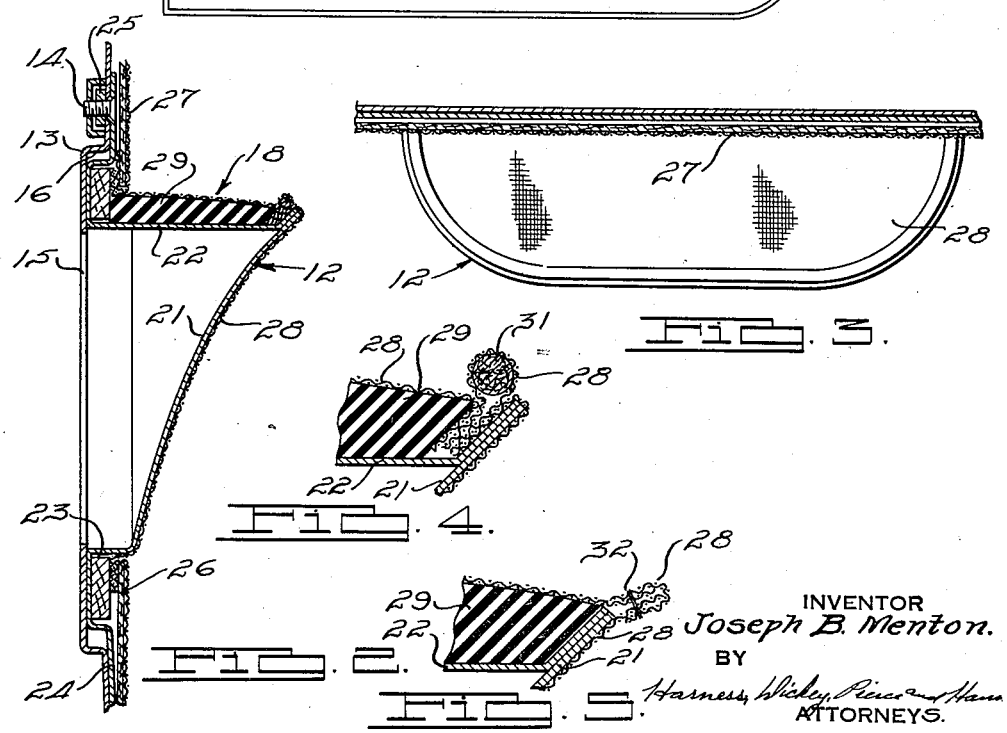
INVENTOR
Joseph B. Menton.
BY
Harness, Dickey, Pierce and Haus
ATTORNEYS.

Patented Apr. 2, 1935

1,996,480

UNITED STATES PATENT OFFICE 1,996,480

DOOR ARMREST

Joseph B. Menton, Detroit, Mich., assignor to The Murray Corporation of America, a corporation of Delaware Application May 7, 1932, Serial No. 609,880

5 Claims. (Cl. 296—44)

My invention relates to arm rests and particularly to an arm rest attached to and made part of the inner panel of a door, to be utilized as a support for the arm of the vehicle occupant.

It has been the practice of drivers of vehicles to support the elbow of the left arm on the window ledge of the door when driving, to be employed not only for a rest but as an element for steadying the wheel and relieving the body of the tension, to which it would be otherwise subjected, during the steering of the vehicle. With the advent of the improved body construction which included the lowering of the body and the decreasing of the height of the window opening, the ledge of the window is in raised position relative to the steering wheel and seat and the window ledge is no longer available as an arm rest.

Since it is impossible for a driver to comfortably rest his arm or elbow upon the window ledge of the present day automotive vehicle, I have provided, on the inner panel of the door, an arm rest which may be more advantageously employed than the window ledge as heretofore utilized. I have ascertained the approximate height that the arm or elbow would be most comfortably supported during the steering operation, and at this point have provided an arcuate rest so shaped that various heights may be utilized for supporting the elbow in accordance with the build of the operator and have padded the arm rest with suitable material to form a cushion for the arm. The arm rest thus provided is far superior to the rest afforded by the window ledge, which placed the operator under a certain amount of strain, and permits the operator to relax by supporting the elbow in such manner as to relieve the body from any strain during the steering operation.

Accordingly, the main objects of my invention are to provide an arm rest in the inner panel of the vehicle door upon which the driver of the car may support his arm; to provide an arm rest on the door which is padded on the surface to provide a cushion for the arm; to provide a top surface for an arm rest which is of arcuate shape to permit the vehicle operator to choose a desired height for supporting the elbow; and, in general, to provide arm rests on the inner panels of the door upon which the driver and passenger of the vehicle may rest their arms, which is simple in construction and economical of manufacture.

Other objects and features of novelty of my invention will be either specifically pointed out or will become apparent when referring, for a better understanding of my invention, to the following description in conjunction with the accompanying drawing, wherein:

Figure 1 is a view, in elevation, of the inner panel of a door having an arm rest thereon embodying features of my invention;

Fig. 2 is an enlarged sectional view of the structure illustrated in Fig. 1, taken on the line 2—2 thereof;

Fig. 3 is an enlarged plan view of the structure illustrated in Fig. 2;

Fig. 4 is an enlarged broken view of the outer portion of the section of the arm illustrated in Fig. 2, and Fig. 5 is a view, similar to that illustrated in Fig. 4, showing a modified form thereof.

In Fig. 1, I have illustrated an automotive vehicle door, from the inner side thereof, showing the inner finished surface having a latch handle 9 and a window positioning handle 11, all of which are of conventional form. Substantially centrally of the lower door panel, I have provided an arm rest 12 which projects outwardly from the inner surface of the panel as more clearly shown in Figs. 2 and 3.

Referring to Figs. 2 and 3, I have shown an enlarged view of the arm rest 12 which is attached to the inner door panel 13 by three screws 14. The panel 13 is provided with an angular shaped opening 15, the metal thereabout being flanged, forming a rabbet 16 for receiving the arm rest.

The base of the arm rest is formed of a metal stamping, triangular in shape, as illustrated in Fig. 1. From the apex 19 of the angle, the metal slopes to the left and right forming substantially a 90 degree angle, which is curved outwardly, as illustrated in Fig. 2, to provide the width to the top of the rest. The top of the rest 22 is of arcuate shape and has a flange on its outer edge which slopes in accordance with the slope of the side 21 and is welded or otherwise secured thereto, as illustrated more clearly in Figs. 4 and 5. The top portion 22 and the angle-shaped side portion are provided with a channel 23 about their peripheral edges which is flanged at 24 to engage the panel 13 when the channel portions are received within the rabbet 16.

Three nuts 25 are provided on the outer surface of the panel which receive the screws 14 for retaining the arm rest thereon. A tacking strip 26 is retained secured within in the channel 23, to which the finish material 27 of the door and the finish material 28 of the arm rest is secured in any well-known manner.

A soft cushioning material 29, such as sponge rubber or any other well-known material which is suitable, is mounted between the top plate 22 and the top finish material 28 of the rest, to constitute a cushion for the arm. The edge of the arm rest is further finished by a piece of the material 28 which is drawn over a cord or similar flexible element 31 to provide a complete finish to the rest. In Fig. 5 I have shown a further and simpler method of finishing the edge of the arm rest, which is that of folding the ends of the two pieces of material together and securing them by the stitching 32, to provide a complete finish for the rest.

The arm rest, thus constructed, provides complete comfort for the driver or the passenger of the vehicle and effects a support for the driving arm of the driver to relieve the strain of driving from the body. By having the top of the rest padded, the road shock will in no way bruise or stiffen the arm, as occurred when the arm was resting directly upon the window ledge. By having the top of the arm rest of sloping arcuate shape, the driver may select any point thereon, conforming to the height of his body, to locate the arm in the most comfortable position relative to the steering wheel.

While I have described and illustrated but two particular methods of forming arm rests on the inner sides of an automotive vehicle door, it is to be understood by those skilled in the art that various changes, omissions, additions, substitutions may be made therein and other methods of constructing arm rests may be employed, without departing from the spirit and scope of my invention, as set forth in the accompanying claims.

I claim as my invention:

1. In combination with a metal door for a vehicle having an inner panel thereon which is provided with a recess in the shape of an arm rest, an arm rest therefor made of metal having a top surface which slopes downwardly toward the rear of the door, a tacking strip provided about the outer periphery of the rest, means for retaining said rest on said panel, and means for finishing said arm rest and the inner surface of the panel.

2. In combination with a metal door for a vehicle having an inner panel thereon which is provided with a recess in the shape of an arm rest, an arm rest therefor made of metal having a top surface which slopes downwardly toward the rear of the door, a tacking strip provided about the outer periphery of the rest, means for retaining said rest on said panel, means for finishing said arm rest and the inner surface of said panel, and a cushion means provided on the top surface of said arm rest under the finishing means.

3. An arm rest for a vehicle body having a sloping upstanding side portion, a top portion joined to said side portion, a rabbet provided about the outer edges of said side and top portions, a tacking strip disposed in said rabbet, and padding and finishing material disposed about said arm rest and secured thereto through the medium of said tacking strip.

4. An arm rest for a vehicle body including, in combination, a top metal element having a marginal flange angularly disposed thereto, a sloping body element having an edge joined to the flange of said top element, a tacking strip provided about the outer edges of said body and top elements, cushioning means provided on said top element, and finishing material provided over on said means and elements and secured through the medium of said tacking strip.

5. In combination with an inner metal panel of an automotive vehicle body door, a metal frame secured to said panel and extending therefrom inwardly of the vehicle body, padding disposed over said frame, and finishing material disposed over said padding to form an arm rest as an integral element of the inner panel of the door.

JOSEPH B. MENTON.